(12) United States Patent
Isupov (10) Patent No.: US 10,807,307 B2
(45) Date of Patent: Oct. 20, 2020

(54) METHOD OF PRINTING WITH A 3D JET PRINTER

(71) Applicant: OOO "PICASO 3D", Zelenograd, Moscow (RU)

(72) Inventor: Viktor Vladimirovich Isupov, Zelenograd (RU)

(73) Assignee: OOO "PICASO 3D", Moscow (RU)

( * ) Notice: Subject to any disclaimer, the term of this patent is extended or adjusted under 35 U.S.C. 154(b) by 204 days.

(21) Appl. No.: 15/757,059

(22) PCT Filed: Mar. 4, 2016

(86) PCT No.: PCT/RU2016/000121
§ 371 (c)(1),
(2) Date: Mar. 2, 2018

(87) PCT Pub. No.: WO2017/039480
PCT Pub. Date: Mar. 9, 2017

(65) Prior Publication Data
US 2018/0250878 A1 Sep. 6, 2018

(30) Foreign Application Priority Data

Sep. 4, 2015 (RU) .................................. 2015137736

(51) Int. Cl.
*B29C 64/209* (2017.01)
*B33Y 30/00* (2015.01)
(Continued)

(52) U.S. Cl.
CPC ............ *B29C 64/209* (2017.08); *B29C 41/32* (2013.01); *B29C 64/227* (2017.08);
(Continued)

(58) Field of Classification Search
CPC ......... B33Y 10/00; B33Y 30/00; B33Y 50/02; B33Y 40/00; B29C 41/00; B29C 67/00;
(Continued)

(56) References Cited

U.S. PATENT DOCUMENTS

| 5,121,329 A | 6/1992 | Crump |
| 5,340,433 A | 8/1994 | Crump |

(Continued)

FOREIGN PATENT DOCUMENTS

| CN | 104129167 A | 11/2014 |
| CN | 104149352 A | 11/2014 |

(Continued)

*Primary Examiner* — Leith S Shafi
*Assistant Examiner* — Inja Song
(74) *Attorney, Agent, or Firm* — Smartpat PLC (57) ABSTRACT

The invention relates to the field of additive manufacturing, i.e. the manufacture of three-dimensional physical objects by the successive deposition (layering) of polymer materials, and more particularly relates to 3D jet printing techniques. The present method of printing on a 3D jet printer includes the controlled displacement of a 3D printer printing head, the supply of at least two filaments of a fusible material to the printing head, the heating of the filaments by temperature-controlled heaters, the alternate activation of one of the nozzles by means of a printer control module, and the pressurized supply of a filament to the active nozzle. During switching of the nozzles, the printer control module activates a printing head displacement module, which transfers one of the nozzles into an active position. The movement of a movable platform alters the position of the nozzles relative to a valve for the nozzles, closing off the openings of the inactive nozzles and freeing the opening of the active nozzle. Once the movable platform has been completely secured in an active nozzle activation position, the printer continues printing using the active nozzle. The technical (Continued)

result is an increase in the quality of the 3D models produced.

5 Claims, 6 Drawing Sheets (51) Int. Cl.
*B41F 17/00* (2006.01)
*B29C 41/32* (2006.01)
*B29C 64/336* (2017.01)
*B33Y 50/02* (2015.01)
*B29C 64/393* (2017.01)
*B29C 64/227* (2017.01)
*B33Y 10/00* (2015.01)
*B29C 64/118* (2017.01)

(52) U.S. Cl.
CPC .......... *B29C 64/336* (2017.08); *B29C 64/393* (2017.08); *B33Y 30/00* (2014.12); *B33Y 50/02* (2014.12); *B41F 17/00* (2013.01); *B29C 64/118* (2017.08); *B33Y 10/00* (2014.12)

(58) Field of Classification Search
CPC . B29C 70/00; B29C 64/10–379; B29C 64/00; B29C 48/301; B29C 48/361; B29C 48/02; B29C 48/0022; B29C 48/08; B29C 48/265; B29C 48/266; B29C 48/30; B29C 48/92; B29C 64/106; B29C 64/118; B29C 64/20; B29C 64/40; B29C 67/0055; B29C 69/001; B29C 70/205; B29C 2793/0027; B29C 2948/92571; B29C 48/315; B29C 45/22; B29C 45/23; B29C 45/232; B29C 45/231; B29C 45/234; B29C 2045/235; B29C 2045/237; B29C 2045/238; B29C 2045/207; B29C 64/209; B29C 41/32; B29C 64/336; B29C 64/393; B29C 64/227; B29C 67/04; B32B 37/00; B41F 17/00

See application file for complete search history.

(56) References Cited

U.S. PATENT DOCUMENTS

| | | | |
|---|---|---|---|
| 5,738,817 | A | 4/1998 | Danforth et al. |
| 5,764,521 | A | 6/1998 | Batchelder et al. |
| 6,022,207 | A | 2/2000 | Dahlin et al. |
| 6,030,199 | A | 2/2000 | Tseng |
| 6,129,872 | A | 10/2000 | Jang |
| 6,508,971 | B2 | 1/2003 | Leyden et al. |
| 6,776,602 | B2 | 8/2004 | Swanson et al. |
| 7,168,935 | B1 | 1/2007 | Taminger et al. |
| 7,625,200 | B2 | 12/2009 | Leavitt |
| 2002/0008335 | A1 | 1/2002 | Leyden et al. |
| 2006/0156978 | A1* | 7/2006 | Lipson .................... A61L 27/36 118/708 |
| 2007/0228590 | A1* | 10/2007 | LaBossiere ............ B33Y 30/00 264/40.1 |
| 2007/0247505 | A1 | 10/2007 | Isowa et al. |
| 2009/0035405 | A1 | 2/2009 | Leavitt |
| 2014/0242208 | A1* | 8/2014 | Elsworthy ............. B29C 31/042 425/375 |
| 2015/0140147 | A1 | 5/2015 | Konstantinos et al. |

FOREIGN PATENT DOCUMENTS

| | | |
|---|---|---|
| CN | 203945690 U | 11/2014 |
| CN | 203945698 U | 11/2014 |
| CN | 103465633 B | 6/2015 |
| DE | 102015103377 A1 | 5/2016 |
| RU | 2007114847 A | 10/2008 |
| WO | 2015038072 A1 | 3/2015 |

* cited by examiner

METHOD OF PRINTING WITH A 3D JET PRINTER

TECHNICAL FIELD

The invention relates to the field of additive manufacturing, i.e. the manufacture of three-dimensional physical objects by the successive deposition (layering) of materials, particularly polymer materials, and more particularly relates to 3D jet printing techniques. The present technical solution can find its industrial use in manufacturing 3D models of wide applicability usable in science, education, engineering, medicine and other fields.

BACKGROUND

The technique disclosed in this description relates to the field of 3D jet printing predominantly implemented using a dispensing head, a nozzle (or multiple nozzles), elements for the adjustment and control of the functionality of the head of a 3D printer, a polymer structural material (thermoplastic) being used as a work material.

There are known in the art similar technical solutions substantially consisting in that a dispensing head of a 3D jet printer forces out drops of heated thermoplastic (a polymer material) onto a cooled base platform. The drops are quickly curing developing thereby layers of the object to be formed.

WO 2015038072 (BIO3D TECHNOLOGIES PTE LTD, SG), B 33Y 10/00 (of 19.03.2015) discloses a method of jet printing using a 3D printer with replaceable printing modules (nozzles).

Similar solutions are disclosed in the following patent documents: CN 203945698, (CHEN LIANG), 19.11.2014—"3D (Three-dimensional) printer head", CN 203945690, (INSTITUTE OF AUTOMATION OF HEILONGJIANG ACADEMY OF SCIENCES), 19.11.2014 "3D printer based on fused deposition rapid prototyping technology", CN 104149352, (SANYA SINAI INNOVATIVE ELECTRICAL AND MECHANICAL ENGINEERING CO, LTD, CHEN MINGQIAO.), 19.11.2014—"Printing head for 3D printer."

Also, there is known in the art a 3D jet printing technology, particularly, disclosed in U.S. Pat. No. 5,121,329 to Stratasys, Inc., published on 9 Jun. 1992 "Apparatus and method for creating three-dimensional objects"; U.S. Pat. No. 5,340,433 Stratasys, Inc., published on 23 Aug. 1994 "Modeling apparatus for three-dimensional objects"; U.S. Pat. No. 5,738,817 to Stratasys, Inc., published on 14 Apr. 1998 "Solid freeform fabrication methods"; U.S. Pat. No. 5,764,521 to Stratasys, Inc., published on 9 Jun. 1998 "Method and apparatus for solid prototyping"; and U.S. Pat. No. 6,022,207 to Stratasys, Inc., published on 8 Feb. 2000 "Rapid prototyping system with filament supply spool monitoring."

These patents disclose a technology and devices (equipment) for the implementation thereof, the technology consisting in creating 3D objects according to a preliminarily prepared model by "layer-by-layer" extrusion depositing a building material (typically a polymer).

In operation, the building material is fed through a nozzle of the dispensing head and deposited as a series of stripes on a substrate in a XY plane. Afterwards, the printing head lifts clear off the substrate along a Z axis (perpendicular to the XY plane) at one step and the process is repeated to form a 3D object similar to a CAD model.

These known methods and devices require to remove the printing head and extruder from the printing zone and additionally heat and cool the nozzles when it is necessary to perform operations associated with replacing the building material, which takes additional time.

The closest prior art for this invention is U.S. Pat. No. 7,625,200, published on 1 Dec. 2009, which describes a 3D printer and a method of printing on a 3D jet printer, the method including controllably displacing a 3D printer printing head, supplying at least two filaments of a fusible material to the printing head, heating the filaments by temperature-controlled heaters with alternately activating one of nozzles by means of a printer control module, and supplying a filament to the activated (active) nozzle under pressure; but the heating thereof is not terminated and the inactive nozzles remain open.

A serious drawback of this closest prior art is a low technological effectiveness that makes itself felt in that when 3D jet printing one item (one model) by different materials (e.g., differing in color or density) the process has to be occasionally interrupted because forced outages of inactive nozzles of the printing head are inherent in printing with two or more materials simultaneously which is conditioned by the necessity to replace the building material (e.g., polymers differing in properties), namely, warming up one nozzle and heating the other. When this closest prior art device is in operation, both nozzles remain heated, and the plastic will leak out of the nozzle which is currently inactive. The leaking plastic will fall to the printable field and thereby disturbing the print pattern. Another drawback of this device consists in that during idle periods plastic remains on the nozzle, which plastic is cured forming a flash which will eventually impede pumping the building material and disturbs the print pattern.

The purpose of the present technical solution is to provide a new method of printing on a 3D jet printer free from the above drawbacks.

The technical result of this technical solution is an increase in the quality of the 3D models produced with reducing time to produce one 3D model.

SUMMARY

This purpose is achieved by providing a method of printing on a 3D jet printer including the steps of controllably displacing a 3D printer printing head, supplying at least two filaments of a fusible material to the printing head, heating the filaments by temperature-controlled heaters with alternately activating one of nozzles by means of a printer control module, and supplying a filament to the active nozzle under pressure. When switching the nozzles of the printing head, a control module of the printer activates a cam gear motor which rotates a cam gear, a movable platform whose trajectory is restricted and directed by guide rollers is propelled around the axis of a pivot screw; when the movable platform is in motion, one of the nozzles is brought into its active condition by decoupling a follower gear of the nozzle brought into its inactive condition and a driving gear and coupling a follower gear of the nozzle brought into its active condition, the traveling of the movable platform displacing the positions of the nozzles relative to a valve for the nozzles; when the movable platform is completely fixed in the position of activation of a first nozzle, the printer continues printing by the first nozzle, the flash remained on the inactive nozzle being cut off by the edge of the opening of the valve for the nozzles.

In one embodiment of the inventive method, the cut-off flash is removed by a cap provided on a guide element of the printing head when the latter is travelling.

In another embodiment of the inventive method, the heat generated by the heated nozzles is removed through openings in the valve for the nozzles.

BRIEF DESCRIPTION OF THE DRAWINGS

The drawings appended hereto will help to understand the essence of the invention. It should be appreciated that these drawings are only illustrative of some embodiments of the invention and not limiting any other embodiments thereof.

The following structural components are shown in FIGS. 1-5:
1—guide rollers;
2—pivot screw;
3—cam gear;
4—position arrester;
5—valve for the nozzles;
6—driving gear;
7—second nozzle follower gear;
8—first nozzle follower gear;
9—second nozzle with a heater;
10—first nozzle with a heater;
11—movable platform.

DETAILED DESCRIPTION

The method of printing on a 3D jet printer works as follows.

Preliminarily, necessary parameters and conditions are determined for the printing, such as resolution of printing; speed of traveling of the printing head; thickness of the external envelope of the item; plastic filling percentage (from 0% when manufacturing hollow items to 100%); need for building a support arrangement in case where the model has overhanging elements; temperature of cooling by controlling the operation of a fan of the printing head, need for a "skirt" to be added to the base of the 3D model in order to improve the adhesion of the initial layers of the built item to the surface of a work table at the beginning of the printing process and to prevent from displacement of the item during the printing process; necessity for printing a substrate; parameters of the consumable material (plastic) etc. For each type of plastic, temperature of the heater to melt the plastic within the printing head and temperature of the work table surface when printing the first layer and subsequent layers of the 3D model shall be chosen. Support arrangement may be built from the material of the model using one printing head, the support arrangement being designed and made gapped relative to the built model in order to provide easily removing it from the surface of the finished item. Otherwise, the support arrangement may be made of a different material using the second nozzle. Some of the above parameters are shown in Table 1 through the example of the following plastics:

ABS (acrylonitrile butadiene styrene resin)—an impact-resistant technical thermoplastic resin based on a co-polymer of acrylonitrile, butadiene, and styrene;

PLA—a bio-degradable, bio-compatible thermoplastic aliphatic polyester; and

HIPS—a high-impact polystyrene whose characteristics are similar to those of ABS-filaments as to impact resistance and hardness; it is completely soluble in Limonene (a liquid hydrocarbon).

HIPS is used as a supporting material for ABS.

Before starting the printing using a PC with a graphics software (e.g., Kompas 3D, AutoCAD, SolidWorks, Blender, 3d Max, Google SketchUp), a 3D model is to be formed that shall correspond to the parameters of the printer. When formed, the model is downloaded into a corresponding software (e.g., Polygon, Slic3r, KISSlicer) providing the layering of the model (in accordance with the settings of the printer) and the preparing of a task for printing. As soon as the task for printing is prepared, readiness of the printer is checked and then the task is sent to the printer using an available interface.

Preparing a task for printing is performed as following. Upon completing all manipulations with the model needed to start the printing, the model is converted into a printer-understandable task. The task presented in a computer code, e.g., in g-code, is developed during splitting the model into multiple layers. The number of the layers is defined by the necessary resolution and is limited by the resolution possibility of a specific printer. When preparing the task, required strength characteristics of the model, print resolution, printing speed and the necessity to build a support arrangement for overhanging elements shall be determined.

(The support arrangement consists of elements automatically formed during layering the model, if necessary. These support elements form supporting planes for the elements of the item. The support arrangement may consist of the same material as the built item, or it may consist of differing materials that can be solved in water or other specialized liquids depending on the specific printer version.)

For each layer, vectors of the printing head travel are constructed—an outline and an inner structure depending on the chosen parameters (wall thickness, filling percentage etc.).

Upon making a new layer, an outline is drawn in the first turn, then the outline is filled according to the filling percentage. Upon passing through the whole height of the model, the support arrangement is built and then the task is exported into a ready file.

As soon as the printing task is prepared, connection with the printer is established. The working capacity of each mechanical unit of the printer and the availability of selected consumable materials are checked. Then the prepared printing task is downloaded into the controller of the printer through a network interface or using a portable information carrier.

Upon completion of all preparations, the printing is started.

When it is necessary to change the material, the nozzles of the printing head can be switched with a minimum interrupt of the printing process. The position of the movable platform (11) is determined by a movable platform position sensor, the position being restricted by a position arrester (4). The movable platform position sensor is capable of determining two positions: Position 1 and Position 2. Position 1 is a position required for the operating of the second nozzle (9) and Position 2 is a position required for the operating of the first nozzle (10). When necessary to bring the nozzle (9) into operative condition, a printer control module (mother board) starts a cam gear motor which rotates a cam gear.

The movable platform (11) whose trajectory is restricted and directed by guide rollers (1) is propelled around the axis of a pivot screw (2). When the movable platform (11) is traveling from the active nozzle (9) position into the active nozzle (10) position, a second nozzle follower gear (7) is decoupled from a driving gear (6), while a first nozzle follower gear (8) is coupled with the driving gear (6). The displacement of the movable platform (11) displaces the positions of the nozzles relative to the valve (5) for the nozzles (see FIG. 1), shutting the opening of the second nozzle (9) and opening the opening of the first nozzle (10). When the movable platform (11) is completely fixed in the position of activation of the first nozzle, the printer goes on with printing by the first nozzle.

Figure 1:
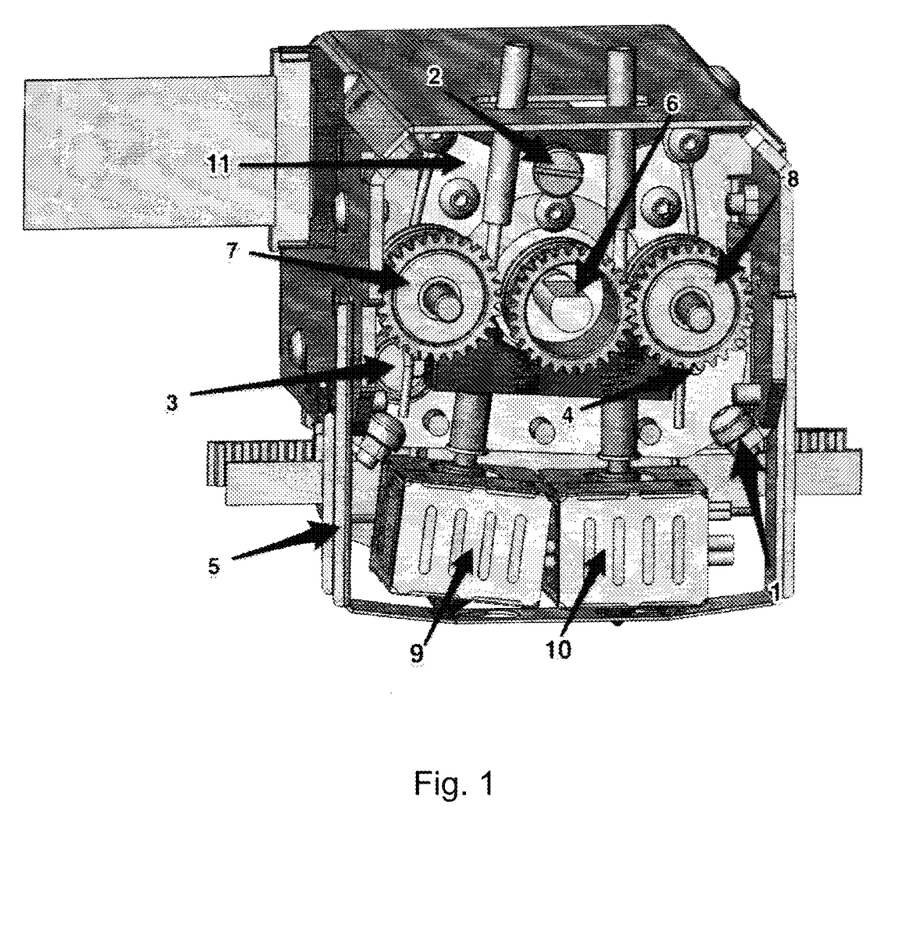
FIG. 1 is a general view of the printing head of a 3D printer.
Figure 2:
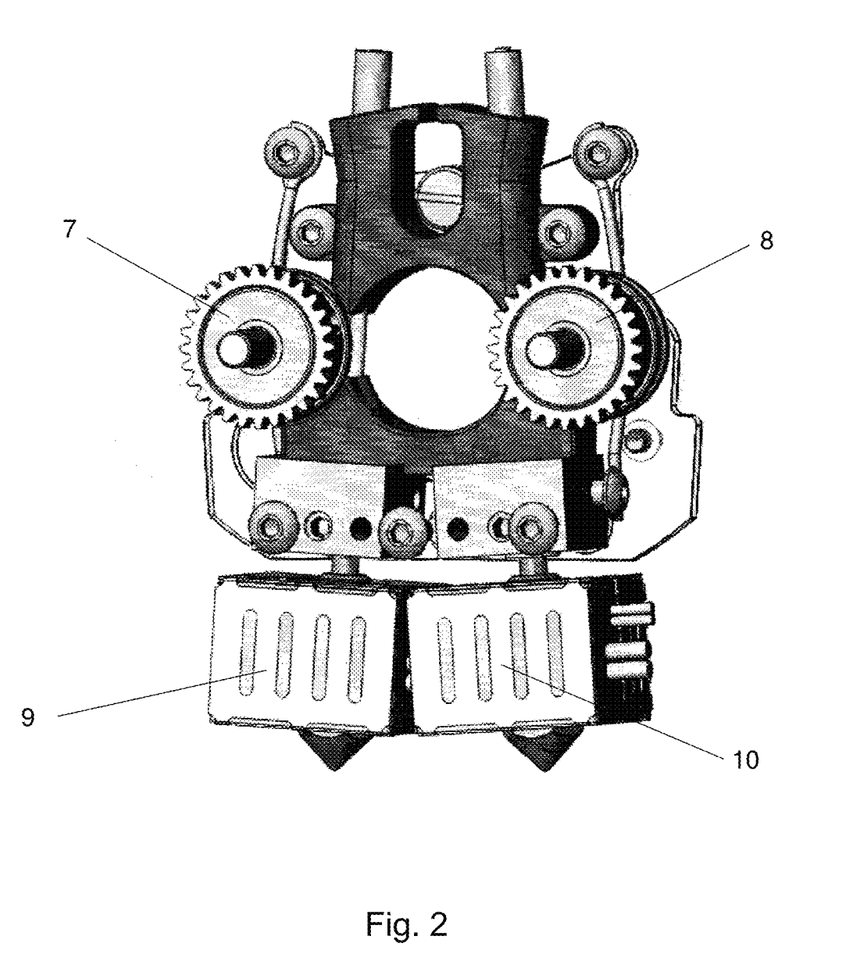
FIG. 2 is a general view of the movable platform of the printing head of a 3D printer in its initial position.
Figure 3:
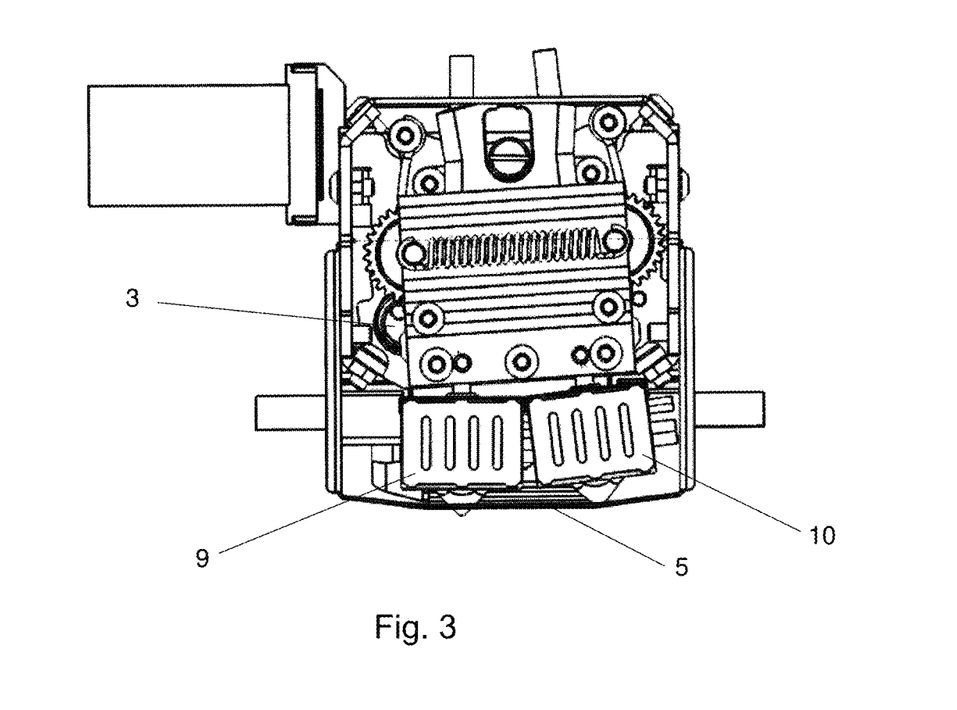
FIG. 3 illustrates the position of the printing head when nozzle 9 is activated.
Figure 4:
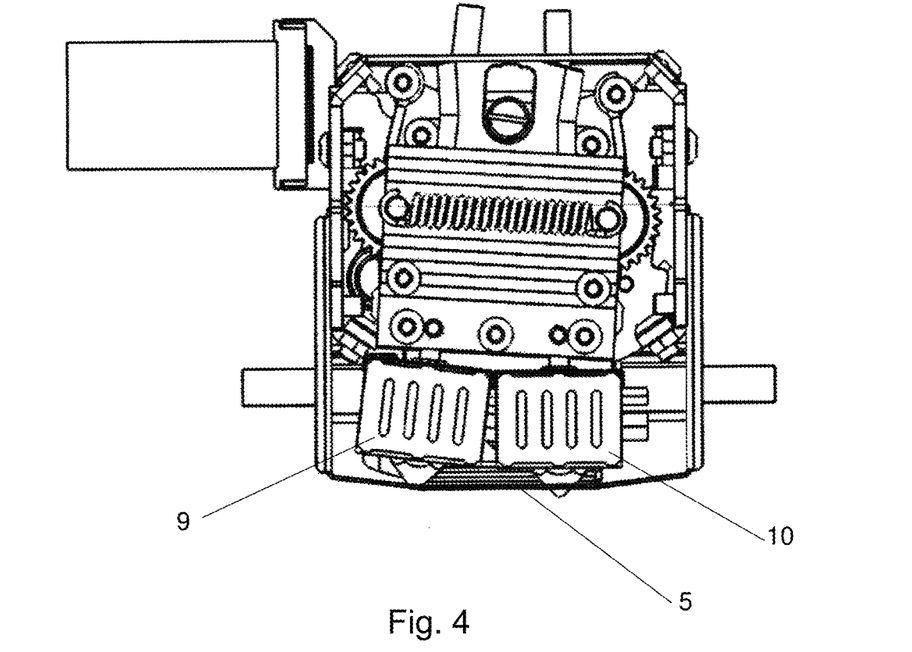
FIG. 4 illustrates the position of the printing head when nozzle 10 is activated.
Figure 5:
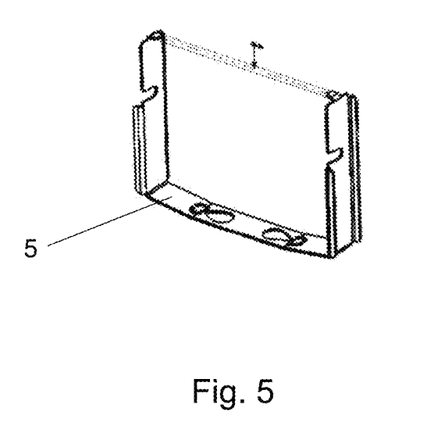
FIG. 5 illustrates the valve for the nozzles in one version of its implementation.

The valve (5) for the nozzles can be embodied in one of the following design versions. The construction of the valve for the nozzles can by presented as a single plate with holes for active nozzles additionally having flash-removing holes aligned with the holes for the nozzles.

When the movable platform is traveling from a position where one nozzle is active to the position where the other nozzle is active, an edge of one of the flash-removing holes cuts off the material residue (flash) from the nozzle changing its condition from active into inactive, the valve for the nozzles at the same time shutting the inactive nozzle, the active nozzle at the same time being housed in a proper hole in the plate.

Figure 6:
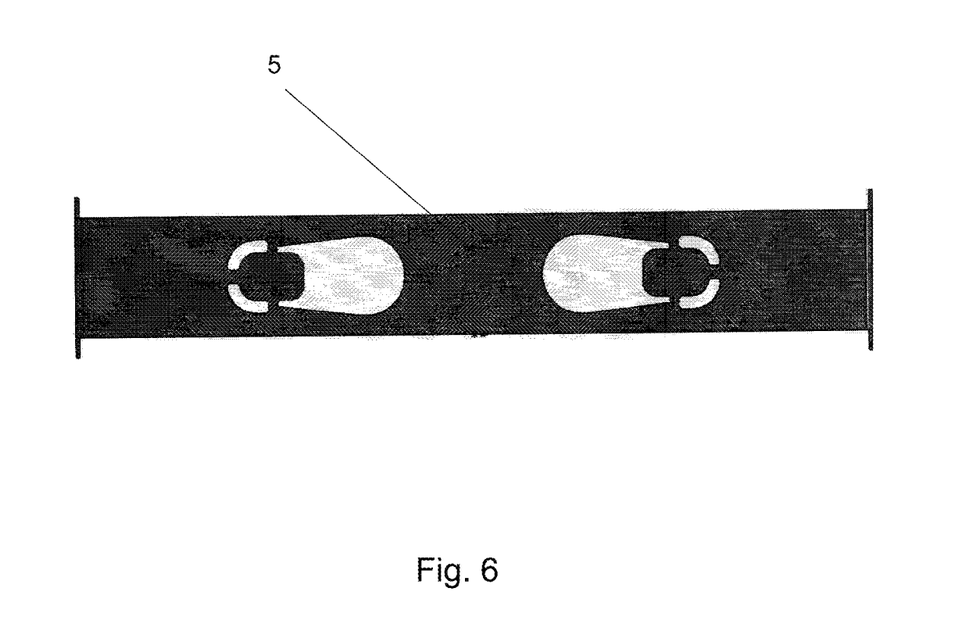
FIG. 6 is a bottom view of the valve for the nozzles in another version of its implementation wherein heat-removing holes are provided.

To remove the heat generated by the heated nozzles arcuate openings are provided on the valve for the nozzles (FIG. 6 illustrates an embodiment with two arcuate openings).

The flash cut off from the nozzle is removed with a cap provided on a guide element of the printing head.

Advantages of the claimed printer consist in that one extruder is used in the change of material, the change being provided by changing the nozzle positions (shifting a nozzle from a working position into a stand-by position), which makes possible to change the material fed to the extruder quickly thereby accelerating the process of manufacturing a 3D model. Also, the production quality is increased due to removing flash from the inactive nozzle, which operation enables achieving a higher quality of 3D printing and a failure-free operation of the device when the nozzle is activated. This significantly reduces time of 3D printing and time of manufacturing 3D models.

| Parameters | ABS | PLA | HIPS |
|---|---|---|---|
| Temperature of the extruder (nozzle) and the first layer/remained layers, ° C. | 230-250/230 | 230-200/200 | 250 |
| Temperature of the table and the first layer/remained layers, ° C. | 90-115/90 | 70/40 | 115 |
| Plastic feed factor (adapted using calibration templates; assigns the speed of motion of the gears of the electric motor of the printing head and the speed of feeding a filament into the printing head) | 0.9-1 | 0.9-1 | 0.9-1 |

The invention claimed is:

1. A method of printing with a 3D jet printer, comprising:
controlling displacement of a printing head having two nozzles;
supplying two filaments of a fusible material to the printing head;
heating the two filaments by temperature-controlled heaters;
alternately activating one of the two nozzles by means of a printer control module; and
supplying one of the two filaments under pressure to the active one of the two nozzles;
wherein the alternately activating one of the two nozzles includes
activating, by the printer control module, a printing head displacement module which transfers an active nozzle of the two nozzles into an active position and an inactive nozzle of the two nozzles into an inactive position,
moving a movable platform altering positions of the two nozzles relative to a valve,
closing an opening of the inactive nozzle by positioning the inactive nozzle above a closed portion of the valve,
freeing an opening of the active nozzle by positioning the active nozzle such that the active nozzle extends through an open portion the valve, and
continue printing using the active nozzle.

2. The method according to claim 1, wherein said printing head displacement module comprises
a motor-driven cam gear,
guide rollers which restrict and direct a trajectory of the movable platform when the movable platform is pivoted around an axis of a pivot screw,
wherein pivoting the movable platform causes
a follower gear of the active nozzle to couple with a driving gear and
a follower gear of the inactive nozzle to decouple from the driving gear.

3. The method according to claim 1, wherein during displacement of the printing head, a flash on the inactive nozzle is cut off by an edge of the open portion of the valve.

4. The method according to claim 1, wherein heat generated by the temperature-controlled heaters is removed through the open portion in the valve.

5. A method of printing with a 3D printer, comprising:
providing a printing head having a first nozzle and a second nozzle;
providing a valve having
a first open portion and a first closed portion, the first closed portion being arranged adjacent to the first open portion, and
a second open portion and a second closed portion, the second closed portion being arranged adjacent to the second open portion; and
activating the first nozzle by
opening the first nozzle by positioning the first nozzle such that it extends through the first open portion of the valve and
closing off the second nozzle by positioning the second nozzle above the second closed portion of the valve, and, subsequently,
activating the second nozzle by
opening the second nozzle by positioning the second nozzle such that it extends through the second open portion of the valve and
closing off the first nozzle by positioning the first nozzle above the first closed portion of the valve.

* * * * *